(12) United States Patent
Mollard et al.

(10) Patent No.: US 9,569,512 B2
(45) Date of Patent: Feb. 14, 2017

(54) METHODS, DEVICES AND COMPUTER PROGRAMS FOR OPTIMIZING THE REPLICATION OF DATA IN COMPUTER SYSTEMS

(75) Inventors: Christian Mollard, La Celle St Cloud (FR); Jean-Louis Bouchou, Rosny-sous-Bois (FR)

(73) Assignee: BULL SAS, Les Clayes sous Bois (FR)

( * ) Notice: Subject to any disclaimer, the term of this patent is extended or adjusted under 35 U.S.C. 154(b) by 421 days.

(21) Appl. No.: 14/003,447

(22) PCT Filed: Mar. 1, 2012

(86) PCT No.: PCT/FR2012/050431
§ 371 (c)(1),
(2), (4) Date: Sep. 5, 2013

(87) PCT Pub. No.: WO2012/120222
PCT Pub. Date: Sep. 13, 2012

(65) Prior Publication Data
US 2014/0019412 A1    Jan. 16, 2014

(30) Foreign Application Priority Data
Mar. 7, 2011    (FR) ...................................... 11 51841

(51) Int. Cl.
*G06F 17/30* (2006.01)
*G06F 11/14* (2006.01)
(Continued)

(52) U.S. Cl.
CPC ..... *G06F 17/30575* (2013.01); *G06F 11/1453* (2013.01); *G06F 11/1464* (2013.01); *G06F 11/1662* (2013.01); *G06F 11/2094* (2013.01)

(58) Field of Classification Search
CPC ................... G06F 17/30575; G06F 17/30286; G06F 11/1453; G06F 11/1464; G06F 11/1662; G06F 11/2094
(Continued)

(56) References Cited

U.S. PATENT DOCUMENTS 5,765,173 A    6/1998  Cane et al.
7,320,009 B1*  1/2008  Srivastava et al. ........... 707/625
(Continued)

FOREIGN PATENT DOCUMENTS

EP        1587007 A2       10/2005
WO    WO 2005/022321 A2    3/2005

OTHER PUBLICATIONS

Leung et al., Spyglass: Fast, Scalable Metadata Search for Large-Scale Storage Systems, Google, 2009, 14-pages.*
(Continued)

*Primary Examiner* — Jean B Fleurantin
(74) *Attorney, Agent, or Firm* — Pillsbury Winthrop Shaw Pittman LLP

(57) ABSTRACT

The replication of data between a source system and a destination system is disclosed. After having calculated a signature for a fragment of data to be replicated, the source system transmits same to the destination system. The latter determines whether or not the signature is known, e.g., whether or not a fragment is associated with the signature. If so, the data to be replicated is reconstructed (with respect to fragment in question). If not, a message indicating that the signature is unknown is transmitted to the source system, which then transmits the corresponding fragment to the destination system. The latter stores and reconstructs the data to be replicated (with respect to the fragment in question).

18 Claims, 4 Drawing Sheets

(51) Int. Cl.
  *G06F 11/16*     (2006.01)
  *G06F 11/20*     (2006.01)

(58) Field of Classification Search
  USPC .......................................................... 707/610
  See application file for complete search history.

(56) References Cited

U.S. PATENT DOCUMENTS

| | | | |
|---|---|---|---|
| 7,440,985 B2 * | 10/2008 | Novik et al. | |
| 2006/0212462 A1 | 9/2006 | Heller et al. | |
| 2007/0288533 A1 * | 12/2007 | Srivastava et al. | 707/203 |
| 2009/0228484 A1 | 9/2009 | Reddy et al. | |
| 2010/0058013 A1 | 3/2010 | Gelson et al. | |

OTHER PUBLICATIONS

PCT, International Search Report for International Application No. PCT/FR2012/050431, dated May 31, 2012. all Pages.

\* cited by examiner

METHODS, DEVICES AND COMPUTER PROGRAMS FOR OPTIMIZING THE REPLICATION OF DATA IN COMPUTER SYSTEMS

CROSS REFERENCE TO RELATED APPLICATION

This application is a U.S. National Phase under 35 U.S.C. §371 of International Application PCT/FR2012/050431, filed Mar. 1, 2012, which designated the U.S., and which claims priority under 35 U.S.C. §119 to France Patent Application Number 1151841, filed Mar. 7, 2011. The disclosures of the above-described applications are hereby expressly incorporated by reference in their entireties.

BACKGROUND

Field

The present technology relates to the transmission and storage of data, in particular of data originating from heterogeneous computer systems, and more particularly to the methods, devices and computer programs for optimizing the replication of data in computer systems, between a source and one or more destination systems, in particular between mass storage systems.

Description of Related Technology

Since the arrival of computer systems, data backup systems play a particularly significant role, not only for storing data before or after processing but also to allow them to be restored in the event of loss.

Thus, typically, a company information processing system comprises distributed computer systems which process data, often stored locally, and a central backup system, used for storing a copy of important data from the computer systems. To this end, the computer systems are linked to a communication network to which a mass data storage system is also linked. Periodically, for example every night, or on command, information systems transmit data to the mass storage system, to be backed up there. Thus, if a computer system experiences a hardware or software failure, is destroyed or suffers operator error, it is possible to reconfigure it or to replace it with an equivalent system.

Among mass storage systems, the so-called second generation mass storage systems, using in particular magnetic media such as magnetic tapes or magnetic cartridges, are particularly widespread. In fact, these systems for backing up and archiving data have large storage capacities and their detachable character facilitates their development. A cartridge typically has a capacity of several hundred gigabytes.

In order to facilitate access to mass storage systems independently of the systems making use thereof, virtual libraries exist, for example so-called virtual tape libraries (VTL) which allow heterogeneous computer systems to access the same mass storage system by using in particular read-write functions referencing tape or cartridge numbers. Moreover, for optimizing the access regardless of the actual performance of the media used, these libraries implement the read-write functions in parallel.

It is recalled here that data storage on magnetic tapes or cartridges is continuous. Thus, unlike storage on disk, it is not necessary to store data in respect of the structure and organization of the stored data. Moreover, the stored data are independent of the structure of these data in the system processing them. In fact, the stored data in the backup systems comprise the payload as well as the structural data used, for example, by a file system.

Moreover, when data are considered essential or critical, for example a company's accounting data, not only are they backed up but the backup is replicated (or duplicated). Generally, the data are replicated in a device remote from the backup device. Such data replication allows, for example, a quick return to activity in the event of a disaster.

Several solutions exist for data replication. Thus, there are so-called synchronous configurations according to which the data to be backed up to two different systems are transmitted to these two systems simultaneously. There are also so-called asynchronous configurations according to which the data to be backed up to two different systems are transmitted to a first backup system which itself sends them to the second backup system. Each of these configurations has advantages and drawbacks.

FIG. 1 shows an example data backup and replication environment, according to an asynchronous configuration.

As shown, the environment 100 in this case comprises a communication network 105, for example an Ethernet network, to which computers, micro-computers and/or servers, generically referenced 110, are connected, or groups of computers, micro-computers and/or servers (not shown), forming sub-systems. The computers, micro-computers and servers 110 can constitute platforms that are homogeneous or heterogeneous. These can be in particular proprietary platforms, called mainframes, for example GCOS8 from Bull and zOS from IBM, or open platforms, for example Unix and Linux (GCOS8, zOS, Unix and Linux are trademarks).

A mass storage system 115 is also connected to the communication network 105, in this case via a communication link 120, preferably a link having a large bandwidth and a high bit rate, for example a link of the Fibre Channel type. The mass storage system 115 constitutes a backup system for data generated, handled and/or processed by the computers, micro-computers and servers 110.

The platforms based on the computers, micro-computers and servers 110 can, for example, execute software backup applications such as GCOS8/TMS, Bull OpenSave, Symantec NetBackup, EMC Networker or other similar software backup applications making it possible to back up data by transmitting it to the mass storage system 115. These platforms then also generally implement magnetic tape management applications such as the computer associate tape library management system (CA-TLMS).

The mass storage system 115 is moreover connected to a second mass storage system 125 in order to replicate data backed up to the mass storage system 115. The mass storage systems 115 and 125 are in this case connected to each other via the communication link 130. The latter can be a specific link or a link established over a communication network such as the Internet.

It is noted that, according to the configuration of the environment 100, all the data stored in the mass storage system 115 can be replicated in the mass storage system 125 or not. Thus, it is possible for only certain data stored in the mass storage system 115, typically the data considered the most important, to be replicated in the mass storage system 125. The data to be replicated in the mass storage system 125 are, for example, identified in the mass storage system 115 according to their type and/or their origin (platform of origin).

In order to optimize data backup, several solutions can be envisaged. In particular, in order to reduce the volume of data to be stored, an optimization consists of compressing these data and/or carrying out a deduplication operation. Generally, data compression consists of recoding the data to reduce their size, while the deduplication of data consists of coding only data that are different and using pointers making it possible, when data are common to several data sets, to back them up in a mutualized fashion. These techniques can be implemented on the side of the mass storage system used for the backup and/or on the side of the mass storage system used for the replication.

They can also be used within the framework of the replication in order to optimize the use of the bandwidth required for the exchange of data between two mass storage systems.

However, although these solutions are efficient overall, they are often complex to implement and generally require significant processing resources. Moreover, as solutions using the deduplication of data are concerned, it is noted that data loss can prove disastrous, in particular if these data are common to several data sets. Thus, even if the deduplication of data often proves to be efficient, it is frequently decided not to use it.

SUMMARY OF CERTAIN INVENTIVE ASPECTS

The technology described herein makes it possible to resolve at least one of the aforementioned problems.

In one aspect, there is a method using a computer for the replication of at least one data item in the form of at least one fragment between a source system and at least one destination system, the source system and the at least one destination system being linked to each other by a communication link, this method, implemented in the source system, comprising,
  calculating a signature of the at least one fragment of the at least one data item to be replicated;
  transmitting the signature to the at least one destination system; and,
  if, in response to the transmission step, a message is received indicating that the at least one signature is unknown, transmitting the at least one fragment to the at least one destination system such that the fragment is only transmitted to the at least one destination system if the signature is considered unknown.

The method thus makes it possible to initiate a differential replication, transmitting only the data that are not available to the destination system, the mechanism for verifying the availability of data in the destination system being simple and efficient. Moreover, the method makes it possible to keep existing performance optimizations linked, for example, with the use of libraries of the VTL type.

According to a particular embodiment, the method further comprises transmitting an item of position and/or size information of the at least one fragment of the at least one data item to be replicated, the position and/or size information being transmitted with the signature. The method thus provides items of information for optimizing the reconstruction, in a destination system, of data to be replicated.

The method further comprises storing the at least one fragment and the associated calculated signature. It is thus possible, using a signature or a data item identifying a signature, to quickly and easily retrieve the corresponding fragment in order to be in a position to transmit it to a destination system that is not in possession thereof.

According to a particular embodiment, the method further comprises breaking down the at least one data item to be replicated into a plurality of fragments comprising the at least one fragment. The method thus makes it possible in particular, to optimize differential replication by adjusting the size of the fragments. The size can be adjusted in order to be sufficiently small so that the probability of a fragment being available in a destination system is high and sufficiently large so that the number of signatures to be processed in order to replicate one data item is not excessive.

Still according to a particular embodiment, the method further comprises filtering, the at least one data item to be replicated being obtained in response to the filtering. It is thus possible to identify the data to be replicated from those not to be replicated.

Still according to a particular embodiment, the method further comprises determining an indication of origin of the at least one data item, the indication of origin being transmitted with the signature. The method thus makes it possible to reduce risk of collision between different fragments which may share the same signature.

In another aspect, there is a method using a computer for the replication of at least one data item in the form of at least one fragment between a source system and at least one destination system, the source system and the at least one destination system being linked to each other by a communication link, this method, implemented in the at least one destination system, comprising,
  receiving at least one signature from the source system;
  if at least one signature was previously stored, the at least one previously stored signature being associated with a previously stored fragment, comparing the at least one received signature with the at least one previously stored signature; and,
  if a signature from the at least one received signature is identical to the at least one previously stored signature, reconstructing, at least partially, the at least one data item to be replicated, using a fragment associated with the at least one previously stored signature identical to the signature from the at least one received signature.

The method thus makes it possible to carry out a differential replication, using data fragments available in the destination system, the mechanism for verifying the availability of data in the destination system being simple and efficient. Moreover, the method makes it possible to keep existing performance optimizations linked, for example, to the use of libraries of the VTL type. Moreover, the method is secure in that it is possible to reconstruct data to be replicated such that after the replication the replicated data are directly accessible. Moreover, the duration of data replication according to the method previously described is largely independent of the latency between a source system and a destination system.

Advantageously, the method further comprises,
  if no signature was previously stored, or if at least one signature of the at least one received signature is different from the previously stored signatures, transmitting a message to the source system, the message indicating that the at least one signature from the at least one received signature is unknown;
  in response to the transmission of the message, receiving at least one fragment; storing the at least one received fragment and a corresponding signature;
  reconstructing, at least partially, the at least one data item to be replicated, using the at least one received fragment.

The method thus makes it possible to carry out a differential replication, receiving only the data that is not available to the destination system.

According to a particular embodiment, the method further comprises receiving at least one item of position and/or size information of a fragment corresponding to a signature of the at least one received signature, the position and/or size information being used for reconstructing, at least partially, the at least one data item to be replicated. Thus, it is possible to partially reconstruct a data item to be replicated with all the fragments available in the destination system despite the absence of other fragments.

Still according to a particular embodiment, the method further comprises calculating a signature of the at least one received fragment. The method thus makes it possible to verify the integrity of the received data.

Advantageously, an indication of origin is received with the at least one signature, the at least one signature being compared only with previously stored signatures associated with an indication of origin identical to the received indication of origin. The method thus makes it possible to reduce risk of collision between different fragments which share the same signature.

According to a particular embodiment, a signature is obtained from a fragment by using a hash function. The method can thus easily be implemented efficiently and reliably, for example by using a hardware card allowing the required calculations to be carried out.

An embodiment is also a computer program comprising instructions suitable for implementing the method previously described when the program is executed on a computer as well as a device comprising means suitable for carrying out the method previously described. Another embodiment is a non-transitory computer readable medium encoded with computer executable instructions suitable for directing a computer or processor to implement the method previously described when the instructions are executed on the computer.

The advantages of the computer readable medium and computer readable medium and of the device are similar to those previously mentioned.

BRIEF DESCRIPTION OF THE DRAWINGS

Other advantages, aims and features will become apparent from the following detailed description, given by way of nonlimitative example, with reference to the attached drawings, in which:

FIG. 2, comprising

DETAILED DESCRIPTION OF CERTAIN ILLUSTRATIVE EMBODIMENTS

Generally, the method and system aims to minimize the volume of data exchanged between two systems, for example between two mass storage systems, one forming a source system, for example a backup system or a data centralization system, and the other forming a destination system, for example a data replication or backup system. To this end, the data received by the source system and to be replicated are, if necessary, broken down into unitary data, called fragments in the rest of the description. A signature can be calculated for each fragment to be transmitted to the destination system for reconstructing the data. These signatures can be transmitted to the destination system which compares them to previously stored signatures associated with previously received and stored fragments. If all the signatures received are present in the destination system, the latter can reconstitute the data to be replicated, using the fragments associated with the signatures present, according to the received signatures.

Conversely, if certain signatures are absent from the destination system, the latter transmits a request to the source system, comprising these absent signatures (or an item of identification data of these signatures), so that the latter can transmit the corresponding fragments. On receiving these fragments, the destination system can calculate the signatures of the received fragments, if they are not received with the fragments, and reconstitutes the data to be replicated, using the fragments associated with the signatures present, according to the received signatures.

The system and method can use a storage system using libraries of the VTL type or, more generally, on data replication functions such as the functions used in network attached storage (NAS) or replication functions for blocks of data, according to which virtual or physical storage locations are used, the data being stored in a sequenced manner at each of these locations.

Figure 1:
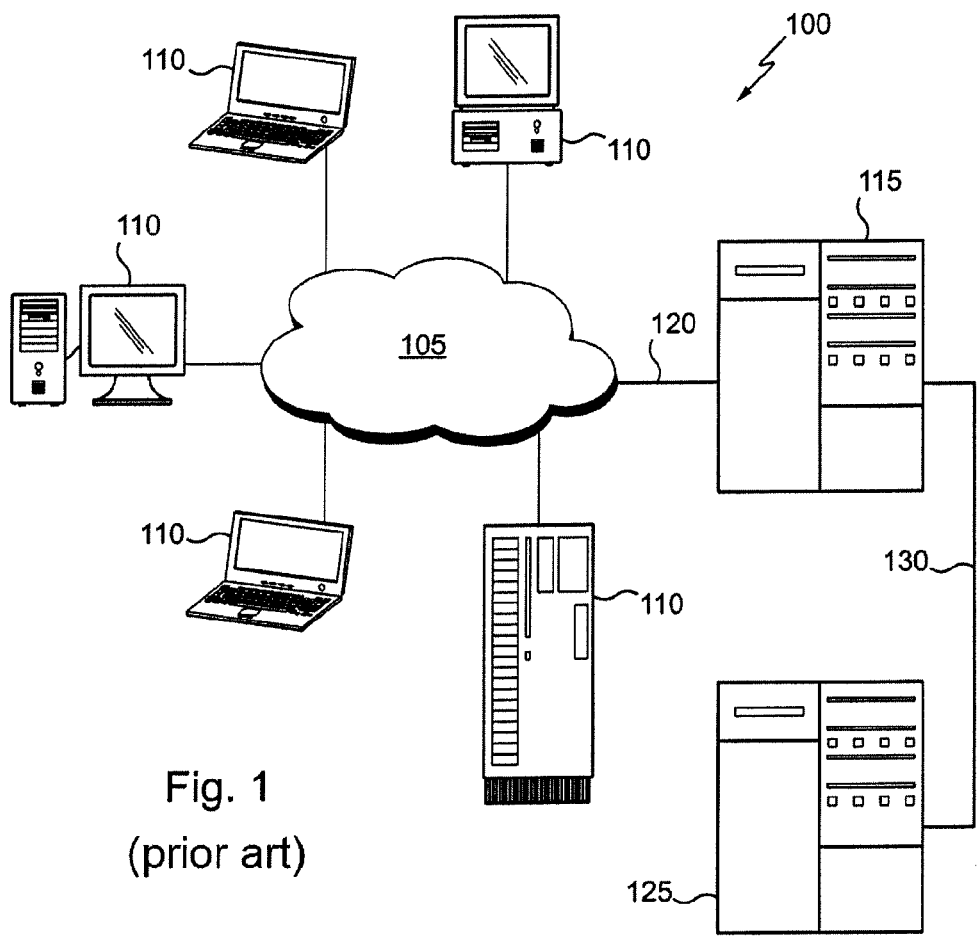
FIG. 1 is a block diagram of an example of a data backup and replication environment, according to an asynchronous configuration.
Figure 2A:
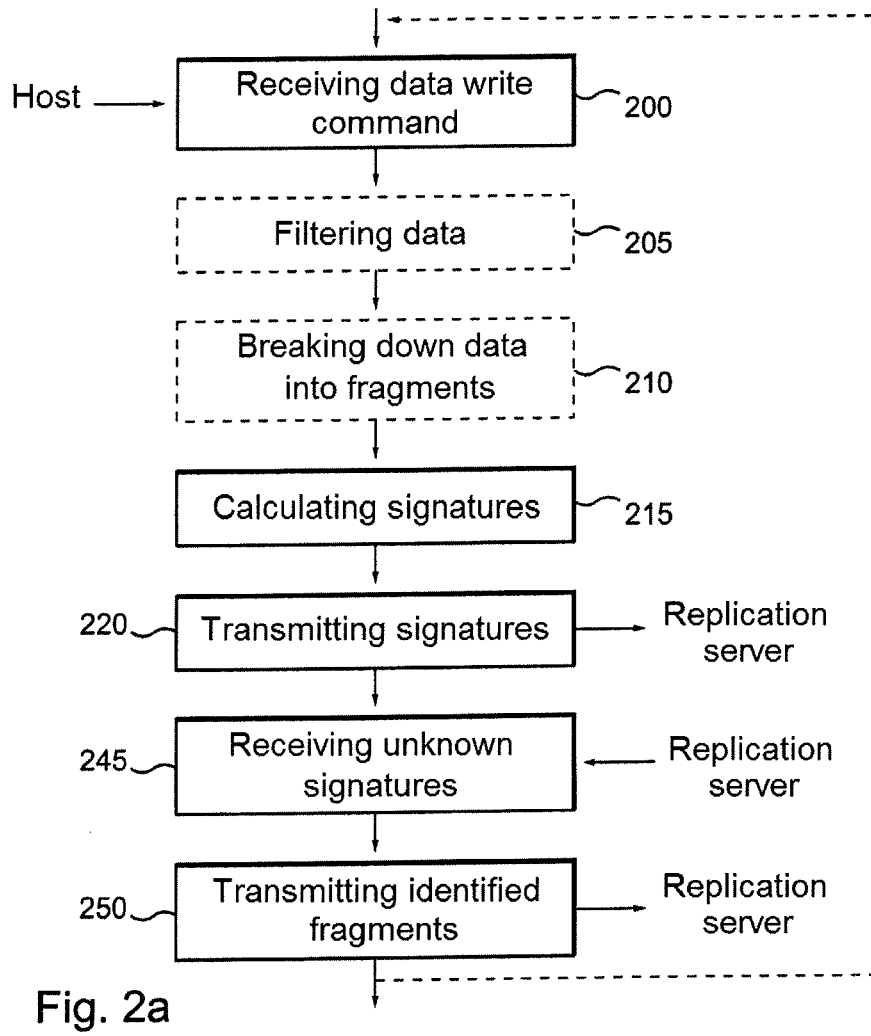
FIGS. 2a and 2b are example flow charts showing certain steps of an example algorithm for transmitting data to be replicated between a backup system and a replication system.
Figure 2B:
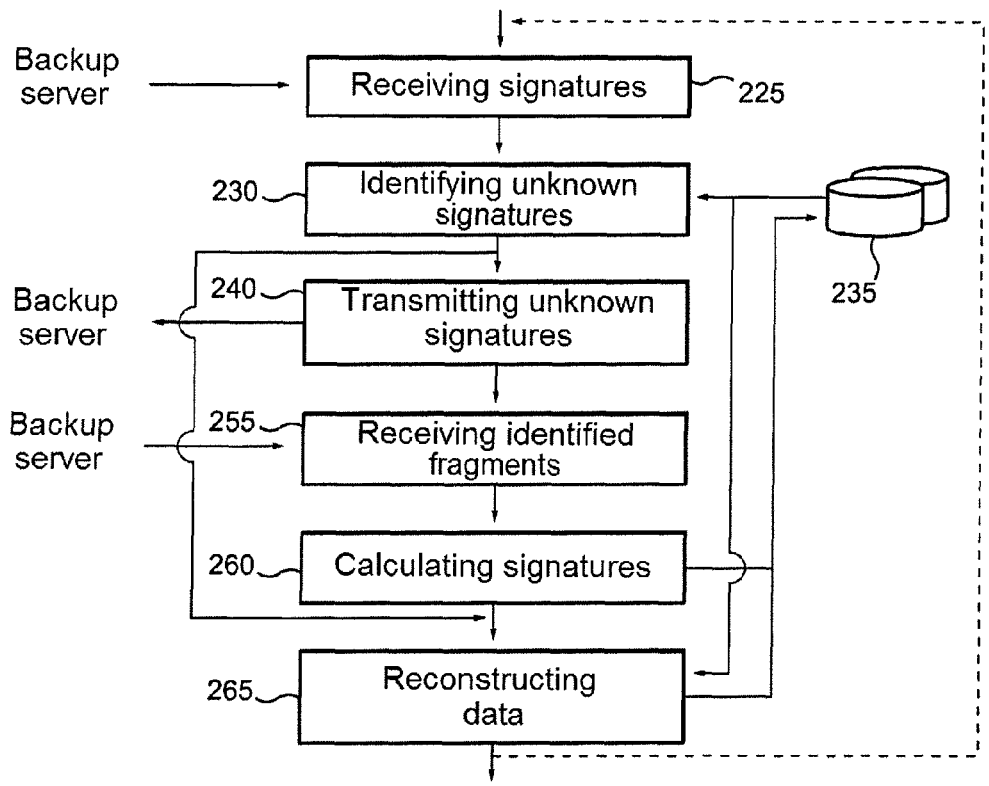

FIG. 2, comprising FIGS. 2a and 2b, shows certain steps of an example algorithm for transmitting data to be replicated between a source system, in this case a backup system referred to as a backup server, and a destination system, in this case a replication system, referred to as a replication server. FIG. 2a relates to the steps that can be implemented in the backup server, for example the mass storage system 115 in FIG. 1, while FIG. 2b relates to the steps that can be implemented in the replication server, for example the mass storage system 125 in FIG. 1.

As shown in FIG. 2a, a first step can consist of receiving a write command comprising a reference of a virtual storage location, typically a virtual cartridge reference, as well as the data to be backed up (step 200). The command and the associated data are typically received from a computer system, generally called the host, such as a micro-computer, computer or server 110 shown in FIG. 1.

In a following step (step 205) the data can be filtered. In fact, even though all the data received to be backed up are backed up, they are not necessarily all replicated. The filtering is advantageously using an importance factor associated with the data, it being possible in particular to determine this criterion in relation to the origin of the data (type of host) or their nature.

The data to be replicated are then, if necessary, broken down into fragments (step 210), preferably in a sequenced manner. A fragment is in this case a series of bytes of the data to be transmitted, for example a series of 256 kilobytes.

As shown by the use of dotted lines, steps 205 and 210 are optional.

A signature can then be calculated for each fragment of the data to be replicated (step 215). These signatures are preferably calculated using cryptographic hash functions (the signatures are then generally called hcodes) or, more generally, any methods of calculation of signatures allowing data to be reliably identified, e.g., with a low risk of collision. By way of illustration, the secure hash algorithm (SHA) functions called SHA 160, SH256 and message digest (MD) functions MD5 can be used. As described hereinafter, the signatures can be advantageously calculated using hardware functions. Each signature has for example a size of 256 bits.

The signatures obtained can then be transmitted (step 220) to the replication server (mass storage system used for the replication). According to a particular embodiment, the signatures are transmitted in the form of files. Such an embodiment offers the advantage of being independent of the transmission protocol used.

Position and, preferably, size information can be advantageously transmitted with the signatures in order to determine locations at which the fragments are to be stored. As described hereinafter, such items of information make it possible, if necessary, to optimize the reconstruction of data to be replicated.

Moreover, a storage location reference can be advantageously transmitted with the signatures in order to determine the location at which the duplicated data are to be stored. This can be, for example, an identifier of a virtual magnetic strip.

The corresponding fragments and the signatures can be advantageously stored temporarily by the backup server in order to make it possible, subsequently, to retrieve a fragment according to a given signature.

As shown in FIG. 2b, the replication server can receive these signatures (step 225) from the backup server (mass storage system used for the backup). As stated previously these signatures are preferably received in the form of files. They can be temporarily stored in order to allow the reconstruction of the corresponding data.

In a following step (step 230), these signatures can be analyzed in order to determine if the corresponding fragments are known to the replication server in order to identify unknown signatures. To this end, the received signatures are compared to signatures previously received or calculated using fragments received and stored with the latter in a storage system 235 of the replication server. According to a particular embodiment, a copy of the signatures can be stored in a buffer memory, preferably permanent, for example a memory of the solid state drive (SSD) type, in order to speed up this comparison step. All the signatures received in step 225 that have not been previously stored by the replication server are considered to be unknown signatures.

The list of the unknown signatures, or items of information allowing the missing fragments from the replication server to be identified (for example the position of the unknown signatures in the sequence of signatures received in step 225), can be transmitted to the backup server (step 240). Again, the list of the unknown signatures can be, preferably, transmitted in the form of files, offering the advantage of independence of the transmission protocol used.

In the interests of clarity, by unknown signatures transmitted by the replication server and received by the backup server is meant, in the rest of the description, signatures as such or items of information allowing identification of the missing fragments in the replication server or identification data of signatures or of corresponding fragments.

It is noted here that when all the signatures received from the backup server are present in the replication server (and associated with fragments) and, advantageously when the data item to be replicated is reconstructed, the latter preferably can send a message to the backup server to inform it of this (in particular so that it deallocates the store containing the list of the signatures transmitted and of the corresponding fragments).

As shown in FIG. 2a, the backup server can receive this list of signatures unknown to the replication server (step 245). The backup server can then identify the fragments corresponding to the signatures received from the replication server and considered by the latter to be unknown. As previously stated, since the fragments and the corresponding signatures are temporarily stored by the backup server, it is therefore possible, using signatures, to retrieve the corresponding fragments. The identified fragments can be transmitted to the replication server (step 250).

As shown in FIG. 2b, after having received fragments from the backup server (step 255), the replication server can calculate a signature for each received fragment (step 260). The algorithm(s) used to calculate the signatures of the fragments can be identical to those used in the backup server so that, for a given fragment, the signature calculated in the backup server is equal to the signature calculated in the replication server.

Alternatively, the signatures can be received with the fragments. However, recalculating them makes it possible to optimize the bandwidth between the backup and replication servers and to verify the fragments received.

The fragments received from the backup server and the corresponding signatures calculated can be memorized in the storage system 235 of the replication server in order to reconstruct the data to be replicated. If necessary, the signatures calculated can also be stored in a buffer memory as previously described.

In parallel, the signatures initially received (in step 225) and not considered to be unknown (in step 230) can be used in order to reconstruct, in the storage system 235 of the replication server, the data to be replicated.

As suggested by the arrows in dotted lines, the method can be repeated for the replication of other data.

It is noted here that the fragments composing data to be replicated are advantageously sequenced. As a result, the reconstruction of these data can be carried out in a sequenced manner, taking account of the availability of the fragments corresponding to the signatures received, according to their order. Alternatively, if the fragments are not sequenced, sequencing order information can be associated with them to allow their sequenced order to be reconstituted.

Figure 3:
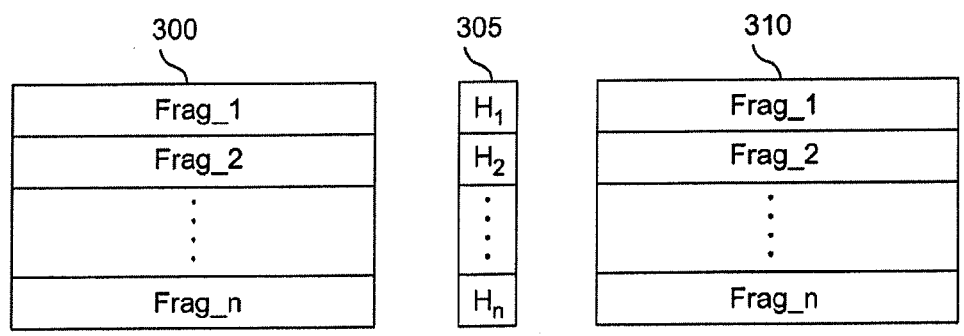
FIG. 3 is a diagram showing a principle of fragmentation and reconstruction of a data set that is to be replicated.

FIG. 3 shows the general principle of fragmentation and reconstruction of a data set that is to be replicated. The reference 300 in this case denotes a data set to be replicated. The latter are broken down into fragments, each fragment being represented by a line and referenced Frag_i. The reference 305 denotes the signatures, a signature ($H_i$) being associated with each fragment (Frag_i) of the data to be replicated. The reference 310 represents the reconstruction of the data to be replicated.

As previously described, a first step of transmission between the backup server and the replication server can consist of transmitting the set of signatures $H_i$. In order to reconstruct the data 310, the replication server can determine if the fragment corresponding to the signature $H_1$ is available in its storage system. If this is the case, the reconstruction of the data starts by accessing the fragment Frag_1 in its storage system. Otherwise, the signature can be considered unknown and can be transmitted to the backup server with the set of unknown signatures. The reconstruction of the data 310 cannot then start before the fragment Frag_1 has been received.

Similarly, if it is possible to start the reconstruction of the data 310 with the fragment Frag_1, the replication server can determine if the fragment corresponding to the following signature, in this case $H_2$, is available in its storage system. If this is the case, the reconstruction of the data can continue by accessing the fragment Frag_2 in its storage system. Otherwise, the signature can be considered unknown and can be transmitted to the backup server with the set of unknown signatures. The reconstruction of the data 310 cannot then continue before the fragment Frag_2 has been received.

The method thus continues until the last fragment, in this case the fragment Frag_n associated with the signature $H_n$ is reached.

Advantageously, items of position and, preferably, size information can be transmitted with the signatures, by the backup server to the replication server, in order to allow the latter to reconstruct non-contiguous data without waiting for the missing fragments from the backup server. It is noted that items of size information can be unnecessary if, for example, the size of the fragments is constant and predetermined.

Thus, returning to the previous example, if the replication server knows fragments Frag_1 and Frag_3, placed respectively before and after fragment Frag_2, it can reconstruct the data portion to be replicated comprising fragments Frag_1 and Frag_3 if it knows the size of fragment Frag_2 (assuming that the replication server does not know fragment Frag_2). It is noted that the position of fragment Frag_2 is in this case provided implicitly by the sequence Frag_1, Frag_2 and Frag_3.

Figure 4:
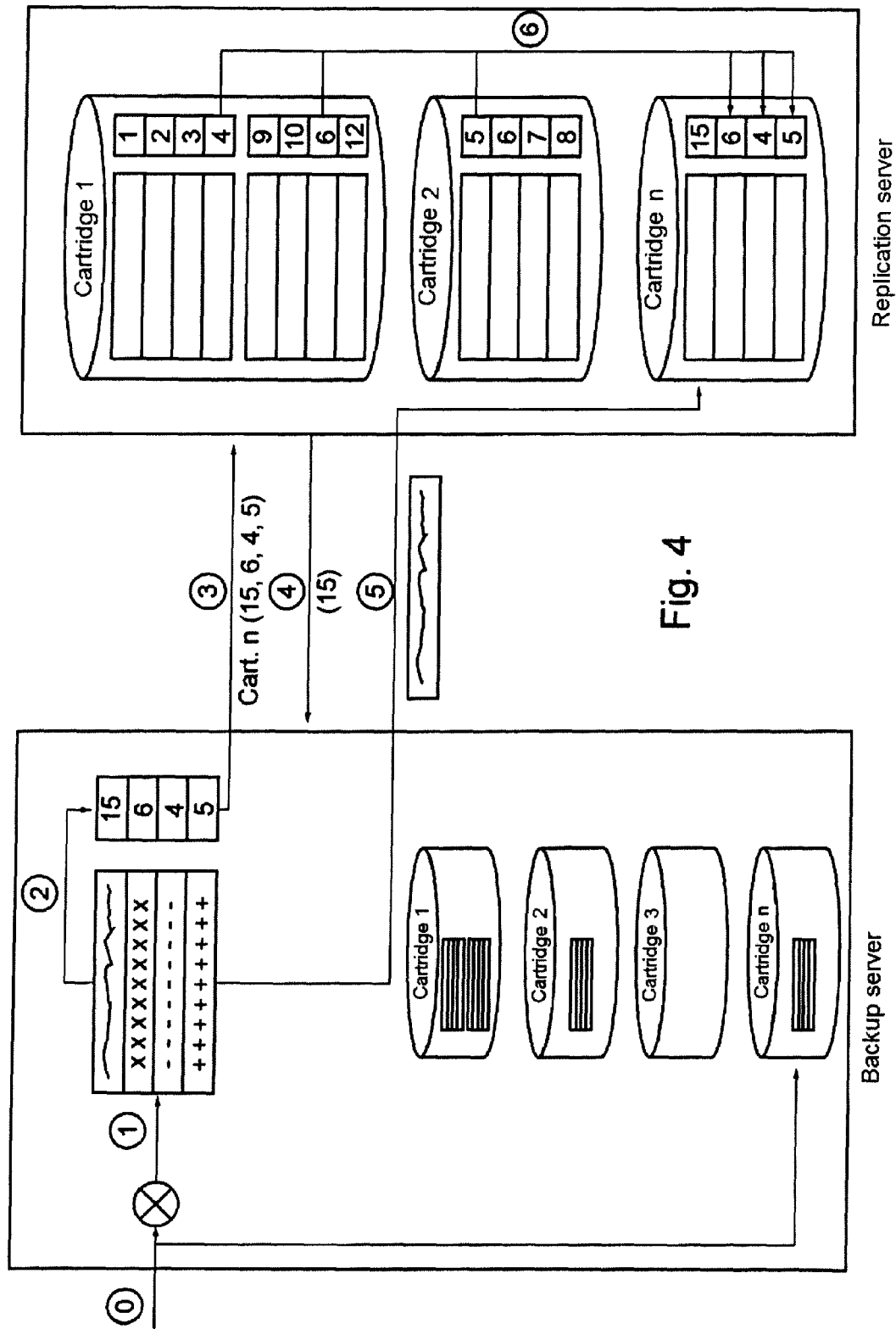
FIG. 4 is a diagram showing an example of data replication in a system implementing the method.

FIG. 4 shows an example of data replication in a system implementing the method. More particularly, FIG. 4 shows in a simplified fashion the transfer of a set of fragments between a backup server, for example the mass storage system 115 in FIG. 1, and a replication server, for example the mass storage system 125 in FIG. 1.

Data received (identified as a step ⓪) by the backup server are backed up and, if they are to be replicated, e.g., transmitted to the replication server, can be stored in the form of an ordered table of fragments (step ①). During the storage of each fragment, a signature can be calculated (step ②). The signatures can be, preferably, stored in the table, linked with the corresponding fragments. The signatures can be advantageously calculated by hardware, preferably via a cryptographic hash function, by using, for example, an Express DX card from the EXAR Corporation. According to the example shown in FIG. 4, four fragments are stored, the signatures associated with these fragments being the values 15, 6, 4 and 5.

It is noted here that if the concept of replication is unknown during the reception of data, in the backup system, there are two possibilities for processing data with a view to possible replication. In a first configuration, all the signatures can be calculated for all the received data. In a second configuration, only the necessary signatures are calculated when the replication is initiated.

Moreover, if the example described with reference to FIG. 3 involves the reconstruction of the data to be replicated by arranging fragments, partial reconstruction of data can also consist of storing sequences of signatures (or identifiers of signatures) allowing subsequent final reconstruction of the data to be replicated, using these sequences, using links established between the signatures and fragments.

These calculated signatures can then be transmitted to the replication server (step ③) with a virtual storage location reference (Cart_n, for cartridge n). When the replication server receives these signatures, it can compare them to signatures that, if necessary, it has previously calculated on fragments received and stored. In this case, the storage means of the replication server can comprise replications of two virtual cartridges, one (cartridge 1) comprising fragments having signature values 1, 2, 3, 4, 9, 10, 6 and 12 and the other (cartridge 2) comprising fragments having signature values 5, 6, 7 and 8. Thus, when the replication server compares the values of the signatures received (15, 6, 4 and 5) with the values of the signatures stored (1, 2, 3, 4, 9, 10, 6, 12, 5, 7 and 8), it concludes therefrom that only the fragment corresponding to the signature 15 is unknown.

The replication server can then send a message (response to the request of the backup server) comprising the value 15 (value of the unknown signature in this example), or an item of information allowing the fragment corresponding to this signature to be identified to the backup server (step ④). It is noted here that the signature having the value 15 corresponds to the first fragment of the data to be replicated. As a result, if the replication server does not know the position and the size of the fragment corresponding to the signature 15, in certain embodiments it cannot start to reconstruct the data to be replicated until it is in possession of the fragment corresponding to the signature having the value 15.

When the backup server receives from the replication server the message comprising the value 15, it can retrieve the fragment corresponding to this signature (in the ordered table of the fragments) and can transmit it to the replication server (step ⑤).

On receiving this fragment, if it is received without its signature, the replication server can calculate the corresponding signature (the signatures calculated by the replication server are done with the same algorithms as those used in the backup server). As backup server, the replication server preferably uses a hardware function for calculating the signatures, for example, an Express DX card from the EXAR Corporation.

The replication server can then start to reconstruct the data to be replicated by using this fragment.

It can then continue the reconstruction of the data to be replicated by using fragments previously received (step ⑥), in particular, in this case, the fragments corresponding to the signatures 6, 4 and 5 (stored temporarily during the reconstruction time of the corresponding data).

During the data reconstruction, the signatures can be stored in association with the fragments in order to allow their re-use, if necessary, during the subsequent data replication.

It is noted here that the calculation of signatures, in the source system, can be carried out before or after the decision has been taken to replicate a data item received for back up. If the decision to replicate a data item must be taken using a fragment and a signature, an additional item of information linked to the origin of the fragment can be, preferably, associated with the fragment. Thus, in the knowledge of the origin of the fragment (for example a reference of the system to the origin of the fragment), a decision can be made to replicate it or not.

Such an item of information of origin can also be used to limit the risks of collision linked to the use of signatures. To this end, an indication of origin can be transmitted by the backup server to the replication server with a set of signatures. On receiving these items of information, the replication server can compare the signatures received only with previously stored signatures, associated with the same origin as the one received. Thus, when the signature of a fragment is stored in a destination system, it can be stored with the origin of the fragment and associated with the received fragment.

While according to the embodiments previously described, the signatures used in the replication server are preferably calculated by the latter using fragments received from the backup server, it is possible to transmit, with the corresponding fragments, the signatures calculated by the backup server in response to a message comprising the unknown signatures. The fragments and the signatures received by the replication server can then be stored by the latter in order to allow the subsequent reconstruction of data to be replicated.

Figure 5:
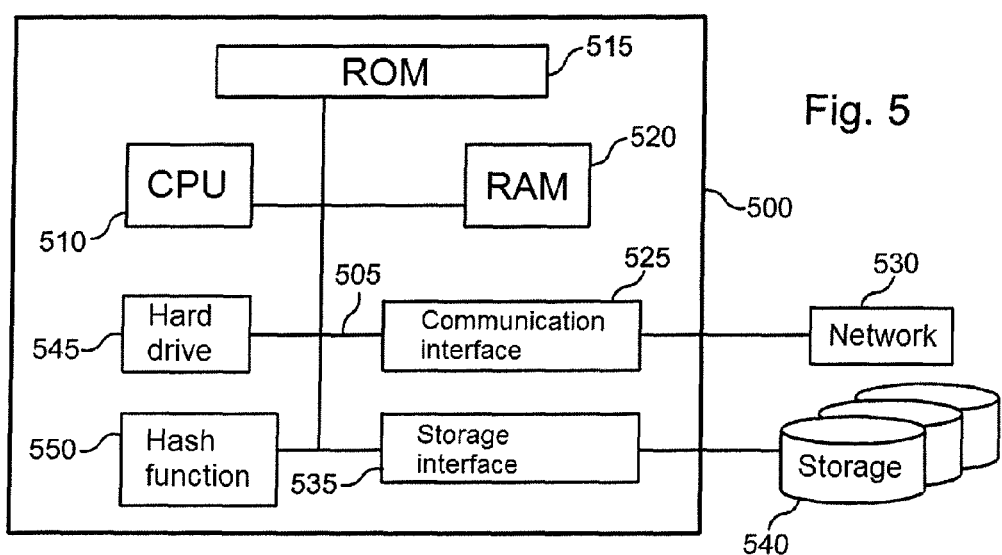
FIG. 5 is a block diagram showing an example of an information processing system or device suitable for implementing a method, in particular the steps described with reference to FIGS. 2a and 2b.

FIG. 5 shows an example of a data processing system or device 500 capable of use for at least partial implementation of a method, in particular the steps described with reference to FIGS. 2a and 2b, e.g., a device capable of use in conjunction with a mass storage system used for the backup and/or replication of data. The device 500 is for example a micro-computer or a computer.

The device 500 preferably contains a communication bus 505 to which are connected:
- a central processor unit (CPU) or microprocessor 510;
- a read-only memory (ROM) 515 capable of containing an operating system and programs such as "Prog";
- a random access memory (RAM) or cache memory 520 comprising registers suitable for recording variables and parameters created and modified during the execution of the aforementioned programs;
- a communication interface 525 linked to a distributed communication network 530, for example the Internet, the interface being capable of transmitting and receiving data; and,
- a mass storage interface 535 linked to a set of hard drives, a system of magnetic tapes or cartridges, or equivalent mass storage devices 540 allowing the backed up or replicated data to be stored.

The device 500 has moreover, preferably, a hard drive 545 capable of containing the aforementioned programs "Prog" and data processed or to be processed as well as a module for the calculation of signatures 550 capable of implementing, for example, a cryptographic hash function. Such a module can in particular consist of a card, for example a peripheral component interconnect card (PCI) such as an Express DX card from the EXAR Corporation. The device 500 can moreover comprise a memory card reader (not shown) suitable for reading therefrom or writing thereto data processed or to be processed.

The communication bus 505 allows the communication and interoperability between the different elements included in the device 500 or linked thereto. The representation of the bus is non-limitative and, in particular, the processing unit is capable of communicating instructions to any element of the device 500 directly or via another element of the device 500.

The executable code of each program allowing the programmable appliance to implement the method can be stored, for example, in the hard drive 545 or in read-only memory 515.

According to a variant, the executable code of the programs can be received using the communication network 530, via the interface 525, to be stored in a manner identical to that previously described.

More generally, the program(s) can be loaded in one of the storage means of the device 500 before being executed.

The central processor unit 510 can control and direct the execution of the instructions or portions of software code of the program(s), instructions which are stored in the hard drive 545 or in the read-only memory 515 or in the other aforementioned storage elements. On power-up, the program(s) which are stored in a non-volatile memory, for example the hard drive 545 or the read-only memory 515, are transferred to the random-access memory 520 which then contains the executable code of the program(s), as well as registers for storing the variables and parameters necessary for implementing the method.

The data to be backed up or replicated can be transmitted to the mass storage devices 540 via the interface 535 which can also be used for accessing data previously stored in the mass storage devices 540, in particular for carrying out a restoration of a system and/or a quick return to activity in the event of a disaster.

It should be noted that the communication appliance containing the device can also be a programmed appliance. This appliance then contains the code of the software program(s) for example set in an application-specific integrated circuit (ASIC).

It is noted that although the technology has been particularly described with a view to an application of the type replicating data from a backup system, it can be used for other applications, in particular for applications for the distribution of data to several addressees and for data synchronization applications.

Figure 6:
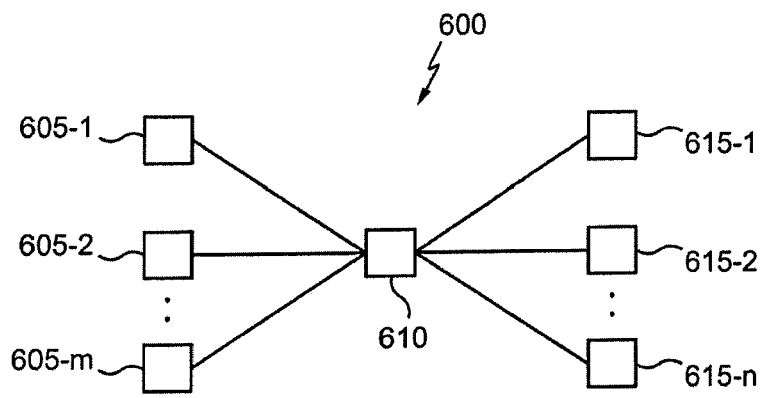
FIG. 6 is a block diagram of an example environment allowing the centralization of data and their distribution by duplication.

Thus, by way of illustration, FIG. 6 represents an environment 600 allowing the centralization of data and their distribution by duplication. These data can be in this case received from several systems 605-1 to 605-m, for example computers. The data can be centralized in the system 610, for example a server, which aggregates and distributes them to systems 615-1 to 615-n, for example mass storage systems. To this end, the system 610 can implement an algorithm similar to that described with reference to FIG. 2a while each of systems 615-1 to 615-n can implement an algorithm similar to that described with reference to FIG. 2b. It is noted that the signatures transmitted by the system 610 can be sent to systems 615-1 to 615-n as a whole, while fragments can be transmitted to these systems in a specific manner, according to the signatures considered unknown received from the latter.

Moreover, it is also noted that the signatures and the fragments exchanged between the source and destination systems can be converted, in particular coded or compressed, in particular in order to optimize their size, using standard algorithms. It should be noted here that if data are converted, for example compressed, after calculation of signatures in the backup system, the reverse conversion, in certain embodiments, must be carried out in the replication system if it is necessary to recalculate signatures in the latter.

Naturally, in order to meet specific needs, a competent person in the field of the technology may apply modifications to the aforementioned description.

The invention claimed is:

1. A method using a computer for the replication of at least one data item in the form of at least one fragment between a source system and at least one destination system, the source system and the at least one destination system being communicatively coupled to each other by a communication link, the method implemented in the source system comprising:
    calculating a signature of the at least one fragment of the at least one data item to be replicated;
    determining an indication of origin of the at least one data item;

transmitting the signature along with the indication of origin of the at least one data item to the at least one destination system; and upon receiving a message from the at least one destination system, in response to the transmission of the signature, indicating that the at least one signature is unknown, transmitting the at least one fragment to the at least one destination system such that the fragment is only transmitted to the at least one destination system when the signature is considered unknown.

2. The method according to claim 1, further comprising transmitting an item of position and size information of the at least one fragment of the at least one data item to be replicated, the position and size information being transmitted with the signature.

3. The method according to claim 1, further comprising storing the at least one fragment and the associated calculated signature.

4. The method according to claim 1, further comprising breaking down the at least one data item to be replicated into a plurality of fragments comprising the at least one fragment.

5. The method according to claim 1, further comprising filtering a plurality of data items according to at least one criterion, the at least one data item to be replicated being obtained in response to the filtering.

6. The method according to claim 1, wherein a signature is obtained from a fragment by using a hash function.

7. A computer program stored in a non-transitory computer readable storage medium comprising instructions adapted for carrying out the method according to claim 1 when the program is executed on a computer.

8. An apparatus comprising at least a processor means for carrying out each of the steps of the method according to claim 1.

9. A non-transitory computer readable storage medium encoded with computer-executable instructions for directing a computer or processor to carry out the method according to claim 1 when the instructions are executed on the computer.

10. A method using a computer for the replication of at least one data item in the form of at least one fragment between a source system and at least one destination system, the source system and the at least one destination system being communicatively coupled each other by a communication link, the method implemented in the at least one destination system comprises:

receiving at least one signature from the source system;

determining whether the at least one received signature was previously stored, the at least one previously stored signature being associated with a previously stored fragment;

comparing the at least one received signature with the at least one previously stored signature; and upon a signature from the at least one received signature being identical to the at least one previously stored signature, reconstructing, at least partially, the at least one data item to be replicated using a fragment associated with the at least one previously stored signature identical to the signature of the at least one received signature, wherein, upon determining that no signature was previously stored, or if at least one signature of the at least one received signature is different from the previously stored signatures, transmitting a message to the source system indicating that the at least one signature from the at least one received signature is unknown.

11. The method according to claim 10, further comprising:

in response to the transmission of the message indicating that the at least one signature from the at least one unknown, receiving at least one fragment;

storing the at least one received fragment and a corresponding signature;

reconstructing, at least partially, the at least one data item to be replicated using the at least one received fragment.

12. The method according to claim 11, further comprising receiving at least one item of position and/or size information of a fragment corresponding to a signature of the at least one received signature, the position and/or size information being used for reconstructing, at least partially, the at least one data item to be replicated.

13. The method according to claim 10, further comprising calculating a signature of the at least one received fragment.

14. The method according to claim 10, wherein an indication of origin is received with the at least one signature, the at least one signature being compared only with previously stored signatures associated with an indication of origin identical to the received indication of origin.

15. The method according to claim 10, according to which a signature is obtained from a fragment by using a hash function.

16. A computer program stored in a non-transitory computer readable storage medium comprising instructions adapted for carrying out the method according to claim 10 when the program is executed on a computer.

17. An apparatus comprising at least a processor means for carrying out each of the steps of the method according to claim 10.

18. A non-transitory computer readable storage medium encoded with computer-executable instructions for directing a computer or processor to carry out the method according to claim 10 when the instructions are executed on the computer.

* * * * *